United States Patent [19]

Ferrier

[11] Patent Number: 5,158,247
[45] Date of Patent: Oct. 27, 1992

[54] HELICOPTER ROPE INSTALLATION WITH A QUICK RELEASE CLASP

[75] Inventor: Jean-Jacques Ferrier, Vecaux, France

[73] Assignee: Societe Nationale Industrielle et Aerospatiale, Paris, France

[21] Appl. No.: 798,558

[22] Filed: Nov. 26, 1991

[30] Foreign Application Priority Data

Dec. 18, 1990 [FR] France ............... 90 15834

[51] Int. Cl.$^5$ ............................................. B64C 1/22
[52] U.S. Cl. .................................. 244/137.2; 24/133; 24/637; 403/322
[58] Field of Search ............... 244/137.2, 137.4, 905, 244/151 A, 151 B, 138 R; 24/68 CD, 133, 134 R, 134 KB, 637, 645; 403/325, 322, 327; 182/142; 292/223, 226, 196

[56] References Cited

U.S. PATENT DOCUMENTS

| | | | |
|---|---|---|---|
| 2,228,060 | 4/1941 | Lescher | 244/151 B |
| 3,801,051 | 4/1974 | Hosterman | 244/151 B X |
| 3,852,854 | 12/1974 | Sigrud | 244/137.2 |
| 3,922,762 | 12/1975 | Turner | 244/151 A X |
| 4,061,103 | 12/1977 | Mampaey | 164/252 |
| 4,188,001 | 2/1980 | Greger | 244/151 B |
| 4,770,373 | 9/1988 | Salo | 244/137.2 |

Primary Examiner—Joseph F. Peters, Jr.
Assistant Examiner—Christopher P. Ellis

[57] ABSTRACT

A rope or cord system on a helicopter comprises a beam (18) fixed to the helicopter floor or roof in the vicinity of an opening (12). Ropes or cords (16) for the lowering to the ground of intervention personnel are attached to bolts (20) by rings (22). The operation of a handle (24) makes it possible to simultaneously and instantaneously release or jettison all the ropes (16) by pivoting a clasp (32) into each of the bolts in opposition to a spring (36). For this purpose the handle (24) simultaneously operates the pivoting latches (42), which cooperate with the clasps by complimentary cam surfaces (40, 46).

12 Claims, 4 Drawing Sheets

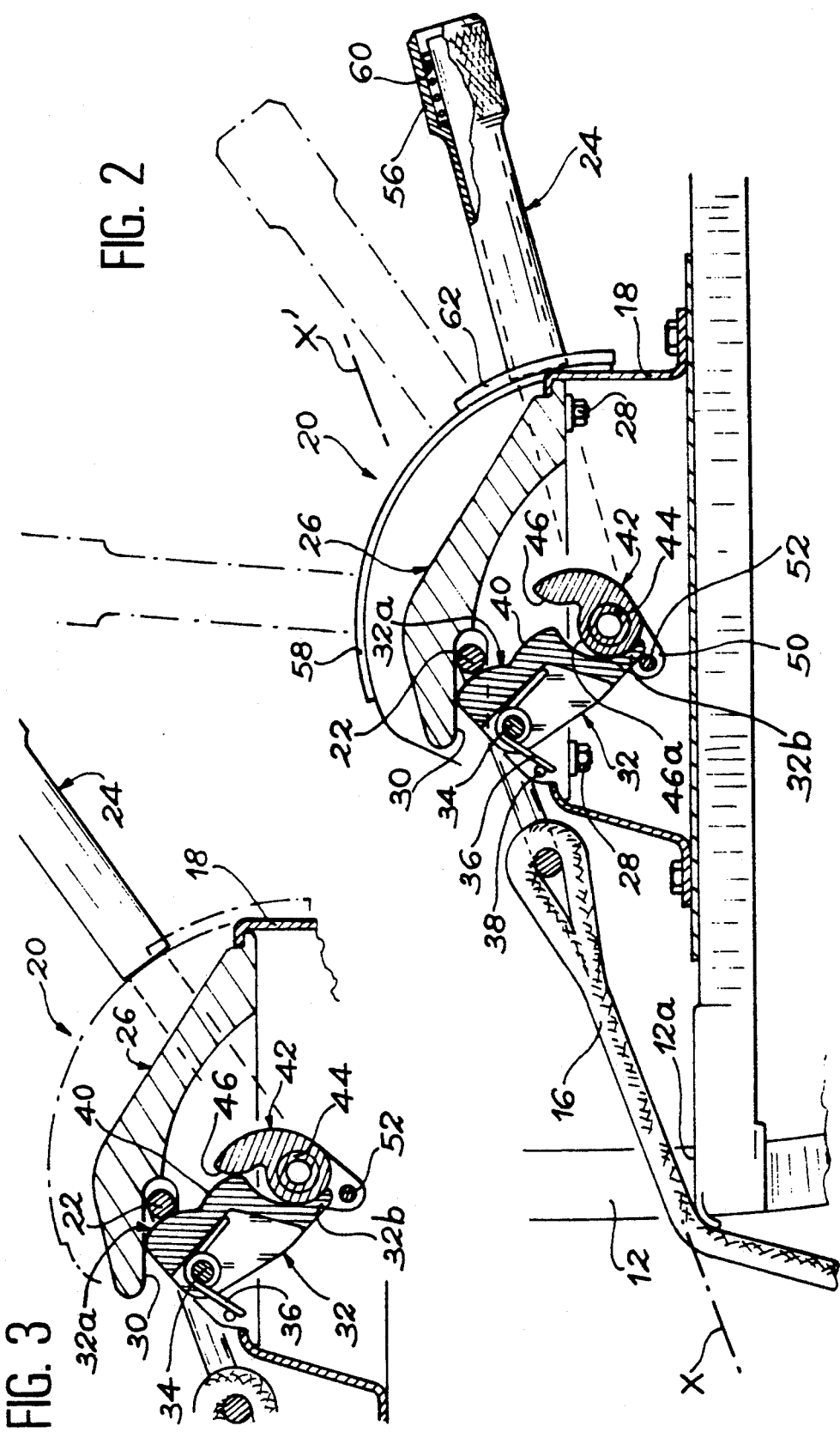

5,158,247

HELICOPTER ROPE INSTALLATION WITH A QUICK RELEASE CLASP

BACKGROUND OF THE INVENTION

1. Field of the Invention

The invention relates to a rope or cord installation on a helicopter making it possible to attach, within a helicopter, at least one rope or cord for lowering rapid intervention personnel to the ground from the said helicopter, when the latter is in stationary flight at a limited altitude close to the length of said rope or ropes.

When it is necessary to bring intervention personnel into a field of hostile action preventing the landing of a helicopter or the stationary flight thereof in the immediate vicinity of the ground, it is sometimes necessary to make use of a rope installation on the said helicopter. This installation enables intervention personnel to slide to the ground from a helicopter in stationary flight at an altitude of approximately 30 m above the ground. Such an operation can in particular be necessary for intervening on a burning building, a group of terrorists, etc.

2. Description of the Related Art including information disclosed under 37 C.F.R. §§ 1.97-1.99 .

The installation used for this purpose up to now generally comprises a rigid transverse beam fixed to the helicopter floor and on which are fixed in non-releasable manner ropes along which the intervention personnel, equipped with a special apparatus, can slide to the ground.

The helicopter is particularly vulnerable when in stationary flight during the lowering of the intervention personnel. It is therefore desirable that it can move away as rapidly as possible from the intervention zone as soon as the personnel have been lowered. However, this rapid moving away is made difficult by the non-releasable ropes which hang below the helicopter and which may become entangled in obstacles projecting from the ground (poles, electric wires, cranes) or in the rotors of the helicopter, particularly in the rear rotor.

SUMMARY OF THE INVENTION

The invention relates to a rope installation on a helicopter, whose original design enables the helicopter to move away very rapidly from the field of action as soon as the last man has reached the ground.

According to the invention, this result is obtained by means of a helicopter rope installation for the lowering to the ground of intervention personnel, characterized in that it comprises an autonomous mechanical assembly integrated into a mounting base or base, which is itself detachably fixed to a structural member within the helicopter cockpit facing a lateral opening and having means for the rapid attachment of at least one ring integral with the upper end of a rope and controlled instantaneous release means for each ring.

As a result of such an installation, all the ropes can be released instantaneously by the mission leader remaining on board the helicopter as soon as all the men have reached the ground.

In a preferred embodiment of the invention, the fast attachment means incorporate at least one attaching bolt having:
 a body which can be fixed to the base,
 a slot formed in said body and whereof one open end can be turned towards the lateral opening of the helicopter, in order to receive the end ring of a rope passing out through said opening,
 a clasp mounted so as to pivot on the body by a first spindle, so that it can occupy a closed position in which the clasp, bearing on a fixed portion of the bolt, closes the open end of the slot and an open, controlled position, in which said opne end is freed, the edge of the clasp turned towards the outside of the slot being shaped in such a way that the end ring of the cord can be introduced into the slot by moving the clasp in opposition to elastic means, which normally maintain the clasp in its closed position and
 a latch mounted so as to pivot on the body by a second spindle and having a cam surface which cooperates with a complimentary cam surface formed on the clasp in such a way that, under the rotation of the latch which is integral in rotation with a release control lever forming the release means, the clasp pivots from its closed position to its open position and frees the ring.

Advantageously, said member is controlled by the release means, so that it can occupy a first position for the safety locking of the clasp in its closed position, a second position in which the safety locking of the clasp is cancelled out, said clasp still occupying its closed position, and a third position in which the clasp is in the open position. The second position makes it possible to introduce the end ring of the rope into the slot.

Preferably, the clasp is mounted so as to pivot on the bolt body by a first spindle located in the vicinity of a line for applying the forces of the ring to the clasp, which is substantially the direction of the end of the cord connected to the ring, when said cord is made taut by the load which it carries. The application of a force along said line consequently tends to pivot the clasp towards its closed position. In the case where the direction of the taut rope would move away from said line, it would not be possible for the clasp to open under the stresses of the loaded rope, because the force exerted by the ring beneath the clasp can in no case stress the latter in the opening direction. Moreover, the moment exerted by the ring on the clasp is sufficiently weak to ensure that a rotation of the latter in opposition on the one hand to the frictional forces of the ring on the clasp and on the other the elastic means normally maintaining the clasp in its closed position, can easily be controlled, even if the rope is tensioned to an exaggerated extent, e.g. by being hooked on an obstacle on the ground. Finally, the clasp has a boss forming a safety abutment, said boss bearing on a fixed portion of the bolt body preventing any rotation of the clasp in the closing direction thereof beyond the position in which the clasp completely closes the slot.

The latch, mounted in pivoting manner on the body by the second spindle, has a cam surface with a cylindrical portion centered on the first spindle and shaped like a gear tooth able to cooperate with a complimentary cam surface of the clasp, said surface being in the form of a tooth system.

Preferably, the latch carries a locking member which, in the first position of the latch, prevents any rotation of the clasp in its opening direction, the gear tooth-shaped cam surface then essentially being spaced from the tooth system-shaped cam surface. In the second position of the latch, the locking member releases the clasp system in rotary form, whilst the gear tooth-shaped cam surface essentially comes into contact with the tooth-shaped cam surface. In the third position, the rotation of the latch leads to the rotation of the clasp in its opening direction and simultaneously moves the clasp safety abutment away from its bearing action on the bolt body.

The apparatus according to the invention preferably comprises at least two bolts mounted on a beam which can be fixed to the floor or roof of the interior of the helicopter. The release or jettisoning means then comprise an operating member able to control a rotation of a shaft carried by the beam and to which are fixed the latches of each of the bolts.

In addition, in order to be able to prevent the release of one of the ropes, e.g. in the case when a man was still attached to it, each of the bolts advantageously comprises a non-opening means, which is normally neutralized and which can be individually actuated.

BRIEF DESCRIPTION OF THE DRAWING

A preferred embodiment of the invention is described in non-limitative manner hereinafter with reference to the attached drawings, wherein show:

FIG. 2 A cross-sectional view of one of the bolts of the attachment device illustrated in FIG. 1, said bolt being shown in its closed and locked position.

FIG. 3 A sectional view comparable to FIG. 2 showing the bolt in its closed position with the safety system unlocked.

DESCRIPTION OF THE PREFERRED EMBODIMENT

Figure 1:
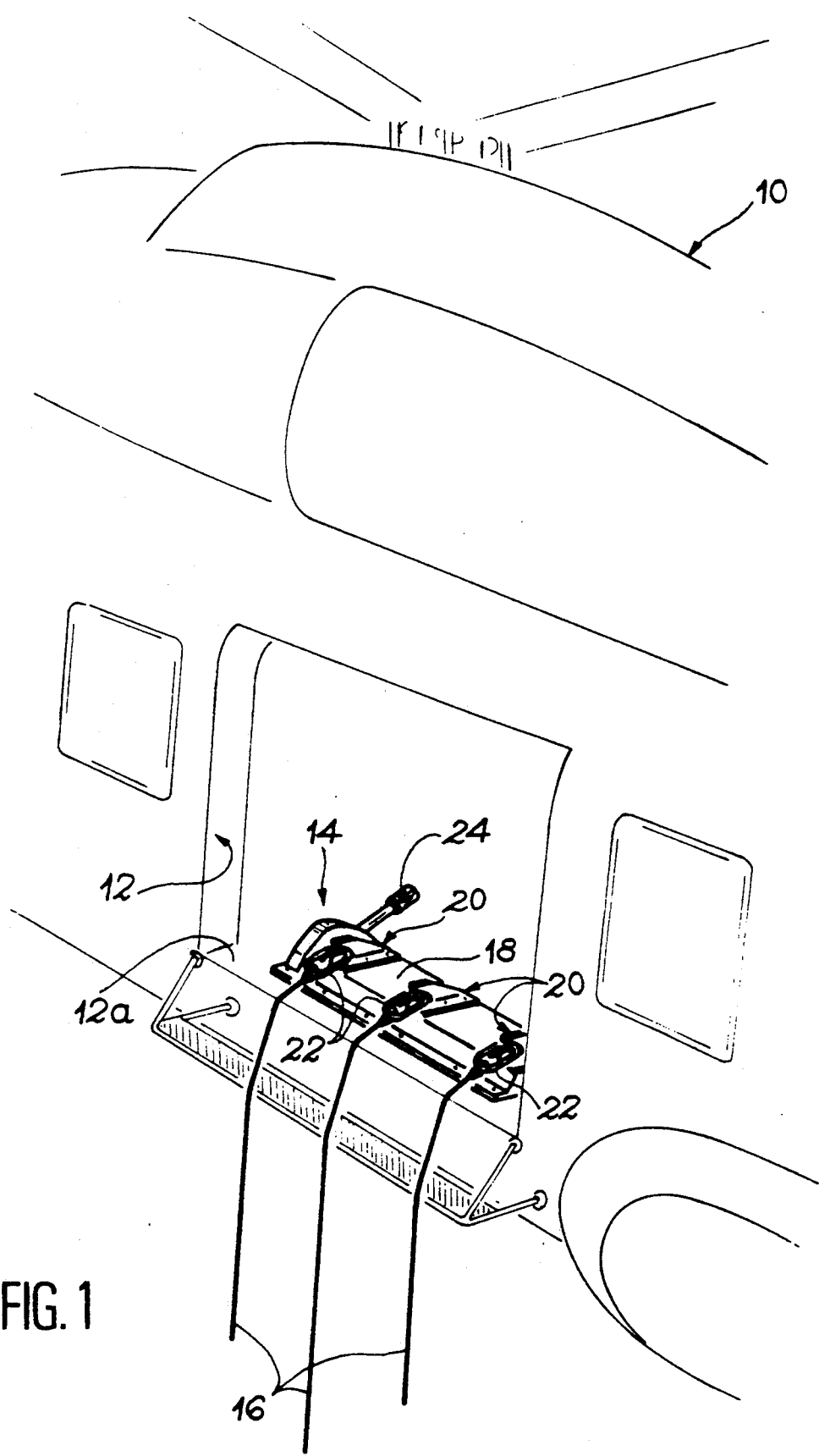
FIG. 1 A perspective view showing a rope installation according to the invention installed within a helicopter on the cockpit floor.

In FIG. 1, reference numeral 10 designates in general terms a helicopter, whose opening or side door is indicated at 12. FIG. 1 also shows a rope installation 14 by which one or more intervention ropes 16 can be attached to the interior of the helicopter 10, so as to hang from the opening 12. The installation 14 can be fixed to the helicopter floor or roof, as illustrated in FIG. 1.

More specifically, the rope installation 14 comprises a base in the form of a beam 18, which is fixed to the floor of the helicopter 10 in the vicinity of the opening 12, in such a way that the longitudinal axis of the beam 18 is substantially parallel to the lower edge 12a of the opening 12. An autonomous mechanical assembly is integrated into the beam 18 and has the same number of bolts 20 as there are ropes 16 to be attached. Thus and solely in exemplified manner, FIG. 1 shows the case of a beam in which are installed three bolts 20, on which are suspended three ropes 16. In order to ensure their attachment to the bolts 20, each of the ropes 16 is provided at its end with a rigid ring 22.

Acoording to the invention, the mechanical assembly of the installation 14 also incorporates means making it possible to control the instantaneous and simultaneous release of each of the ropes 16 attached thereto. These release means, which will be described in greater detail hereinafter, are controlled by an operating member constituted by a lever 24 having a handle in the represented embodiment. This lever 24 is placed at one end of the beam 18 and simultaneously acts by means of an appropriate mechanism on each of the bolts 20. In view of the fact that all the bolts 20 are identical, only one of them will be described hereinafter relative to FIG. 2.

FIG. 2 shows that each of the bolts 20 has a body 26 fixed to the beam 18, e.g. by screws 28. This body 26 has a slot 30 oriented substantially parallel to the helicopter floor and open on the side of the opening 12.

In its part located below the slot 30, the body 26 has a recess in which a clasp 32 is mounted so as to pivot about a spindle 34, which is oriented parallel to the longitudinal axis of the beam 18 and is positioned in the vicinity of the open end of the slot 30 and below the latter. A torsion spring 36, fitted on the spindle 34 in a recess of the clasp 32, bears by one of its ends on a rod 38 fixed to the body 26 and by its opposite end on the clasp 32, so as to normally move the latter towards a closed position illustrated in FIG. 2. In this closed position of the clasp 32, an upper portion of the latter is very close to the upper edge of the slot 30 in the vicinity of its open end, so as to close the said end.

More specifically, the portion of the clasp 32, which closes the open end of the slot 30 in the closed position of the clasp is approximately shaped like a triangle, whereof one of the apices touches the upper edge of the slot 30. The side of said triangle turned towards the outside of the slot forms a ramp making it possible to insert the end ring 22 of the rope 16. Thus, when the ring 22 bears against said side during its introduction into the slot 30, the inclination of said slide produces a moment, which has the effect of pivoting the clasp 32 in opposition to the spring 36, in a clockwise direction considering FIG. 2 allowing the passage of the ring which can then reach the bottom of the slot 30.

Moreover, when the ring 22 is confined between the edge 32a of the triangular portion of the clasp 32, which normally closes the open end of the slot and which is essentially shaped like a circular arc centred on the spindle 34 and the bottom of the slot 30, the line XX' (FIG. 2) for the application of the force of the ring on the clasp, which joins the bearing point of the ring 22 to the lower edge 12a of the opening 12 on which bears the rope 16, passes at a limited distance from the geometrical axis of the spindle 34 and above the latter. Consequently the application of a force along said line XX', e.g. due to the weight of a man suspended on the rope 16, tends to pivot the clasp 32 towards its closed position. Thus, the necessary safety is ensured, even if the spring 36 is defective.

In more general terms, in the case where the axis of the rope 16 differs from the line XX', the bearing resultant of the ring 22 on the curved edge 32a of the clasp 32 is still oriented with respect to the clasp rotation axis in such a way that the moment of said resultant with respect to said rotation axis tends to turn the clasp in the closing direction and thus creates a self-locking effect compensating any failure of the return spring 36. This effect can be accentuated by not allowing coincidence of the centre of rotation of the clasp 32 and the centre of curvature of the curved bearing edge 32a of the ring 22.

Moreover, in view of the fact that the distance between the force application line XX' and the geometrical axis of the spindle 34 is very small, the rotation moment exerted in the clasp closing direction is sufficiently weak that it is possible to pivot the clasp 32 in the reverse direction without exerting an excessive operating force thereon.

The edge of the triangular portion of the clasp on which bears the ring 22 is extended downwards in the form of a tooth system-shaped cam surface 40, whose lower end is formed on a tapered portion 32b forming a safety bearing boss for the clasp 32 in the closed position.

Figure 5:
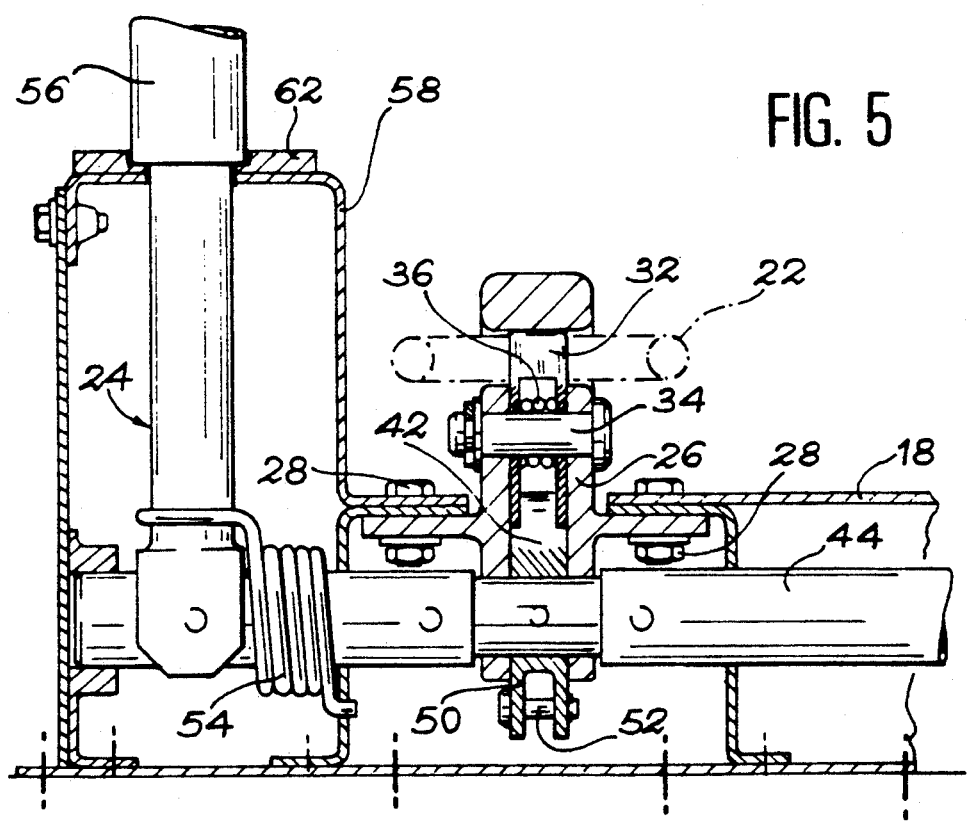
FIG. 5 A longitudinal sectional view showing one of the bolts and the mechanism controlling its operation.

Each of the bolts 20 also has a latch 42 mounted so as to pivot in the body 26 about an axis parallel to the spindle 34 and in front of the tooth system-shaped cam surface 40 of the clasp 32. The pivoting axis of each of the latches 42 is materialized by a shaft 44 extending over the entire length of the beam 18, the operating handle 24 being fixed to one end of the shaft 44, as illustrated in FIG. 5.

In its portion turned towards the cam surface 40 of the clasp 32, the latch 42 has a gear tooth-shaped cam surface 46, which is complimentary to the cam surface 40. The cam surface 46 formed on the latch 42 has a lower cylindrical portion 46a centred on the geometrical axis of the spindle 44. This cylindrical portion 46a is permanently in contact with a lower concave portion of the tooth system-shaped cam surface 40 formed on the clasp 32.

In the lower cylindrical portion 46a, the latch 42 has a forked portion 50 carrying at its end a safety locking rod 52 parallel to the latch pivoting axis.

When the latch 42 occupies a first locking position illustrated in FIG. 2, the tapered portion 32b of the clasp 32 penetrates the forked portion 50 of the latch 42 and is confined between the cylindrical portion 46a and the rod 52. Any pivoting of the clasp 32 about its spindle 34 would then be impossible. This first position of the latch 42 consequently constitutes a safety locking position for the clasp 32 in its closed position.

In said first position of the latch 42, FIG. 2 also shows that the upper portion of the gear tooth-shaped cam surface 46 of the latch 42 is spaced from the corresponding portion of the tooth system-shaped cam surface 40 of the clasp 32.

As shown in FIG. 3, a first rotation of the latch 42 about its axis has the effect of bringing the upper portion of the gear tooth-shaped cam surface 46 into contact with the upper portion of the tooth system-shaped cam surface 40. This first rotation of the latch does not bring about any pivoting of the clasp 32 about its spindle 34. When this second position of the latch 42 is reached, the tapered portion 32b of the clasp 32 is freed from the safety locking rod 42, so that it is then possible for the clasp to pivot clockwise about its axis on the basis of FIG. 2. This second position of the latch 42 consequently corresponds to a waiting position, in which the clasp 32 still occupies its closed position, but in which it is possible to introduce the ring 22 into the slot 30 by pivoting the clasp 32 in opposition to the action of the spring 36.

When the pivoting of the latch 42 in the counter-clockwise direction is continued beyond the second position, as illustrated in FIG. 3, the cooperation of the gear tooth-shaped cam surface 46 with the tooth system-shaped cam surface 40 has the effect of pivoting the clasp 32 in a clockwise direction in opposition to the action of the spring 36 and the frictional forces of the ring 22 on the surface 32a of the clasp 32. When this pivoting reaches its maximum amplitude, the clasp 32 occupies an open position, illustrated in FIG. 4, in which the open end of the slot 30 is totally freed. An instantaneous release of the rope 16 disengaged from the bolt 20 is then obtained, this position being shown in FIG. 4.

Figure 4:
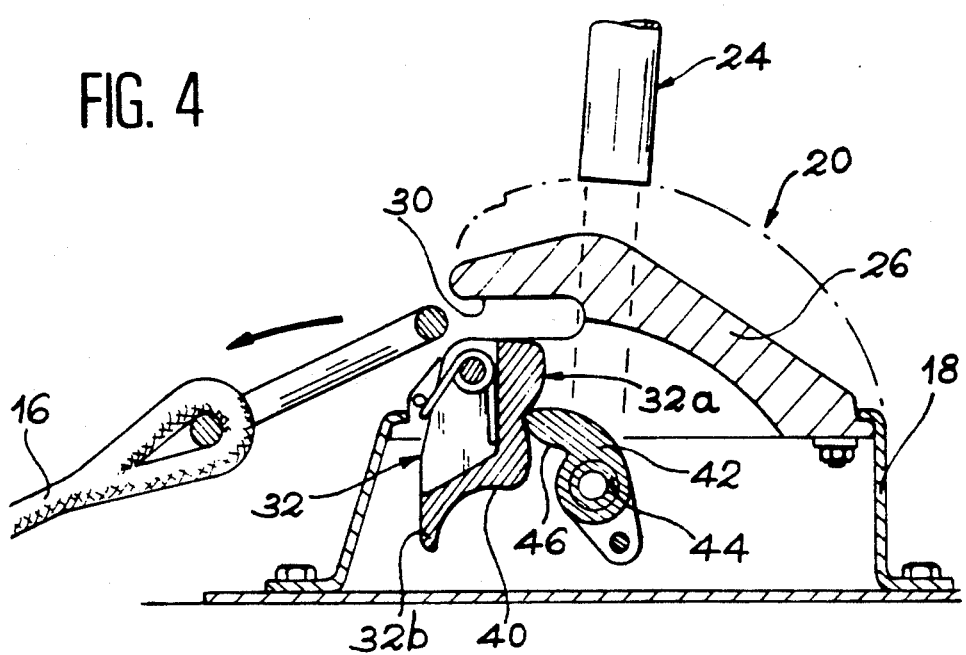
FIG. 4 A sectional view comparable to FIGS. 2 and 3 showing the bolt in its open rope release position.

The simultaneous pivoting of each of the latches 42 between the three positions respectively represented in FIGS. 2, 3 and 4 is controlled by acting on the operating lever 24.

As illustrated in FIG. 5, this operating lever 24 is drawn back to the position corresponding to the third position of the latches 42 by a torsion spring 54 placed round the shaft 44 and whose ends respectively bear on the lever 24 and on the beam 18.

As is more particularly illustrated in FIG. 2, in its part which can be grasped by the operator, the operating lever 24 has a handle extended by a sliding sleeve 56 moved by a compression spring 60 towards a guide 58 mounted on the beam 18. An indentation 62 on the guide 58 prevents any pivoting of the lever 24 between the first and second positions of the latch 42 and conversely for as long as the operator does not pull towards him the handle extended by a sliding sleeve 56 in opposition to the spring 60. When the latches 42 are in their first position ensuring a safety locking of the system of latches 32, said arrangement provides a supplementary safety and security system preventing any untimely release of the ropes 16 due to an accidental manipulation of the lever 24.

The rope system described hereinbefore with reference to FIGS. 1 to 5 makes it possible to attach in the interior of a helicopter one or more ropes 16, along which intervention personnel can be lowered to the ground when the helicopter is in stationary flight roughly 30 meters above the ground. Moreover, this mechanism enables the mission leader who has remained on board the helicopter to simultaneously release all the ropes 16 attached to the installation, by acting on the lever 24, as soon as the last man has reached the ground. It is then possible for the helicopter to very rapidly leave the area of intervention without risking one or more ropes becoming entangled in the rotors or in ground obstacles.

In a constructional variant which will be described relative to FIGS. 6 to 8, the installation also has, on each of the bolts, an additional mechanism optionally making it possible not to release the rope fixed to said bolt during the simultaneous release of all the ropes of the installation. This non-release mechanism can be useful if a man remains attached to his rope for any random reason, when the release of the other ropes would be desirable.

In this constructional variant, the elements identical to those described hereinbefore with reference to FIGS. 1 to 5 will be designated by the same reference numerals, increased by 100.

Figure 6:
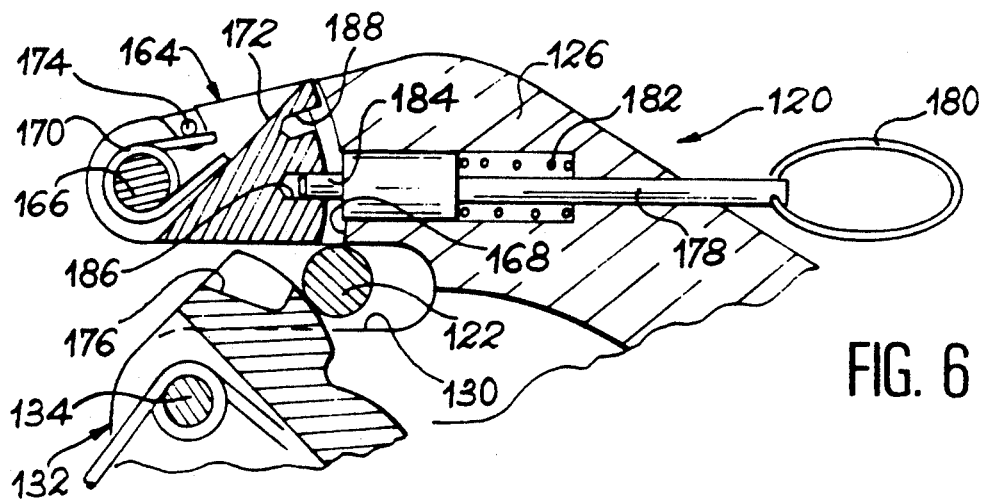
FIG. 6 A partial cross-sectional view of one of the bolts illustrating a variant in which a non-opening means is associated with said bolt, said means being shown in its normal retracted position.
Figure 7:
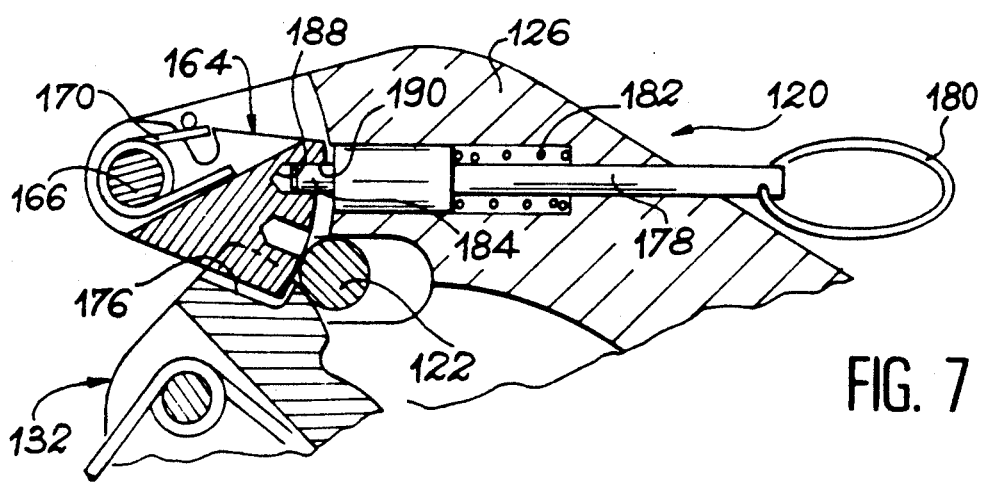
FIG. 7 A sectional view comparable to FIG. 6 showing the non-opening means in its closing position, the bolt being closed.
Figure 8:
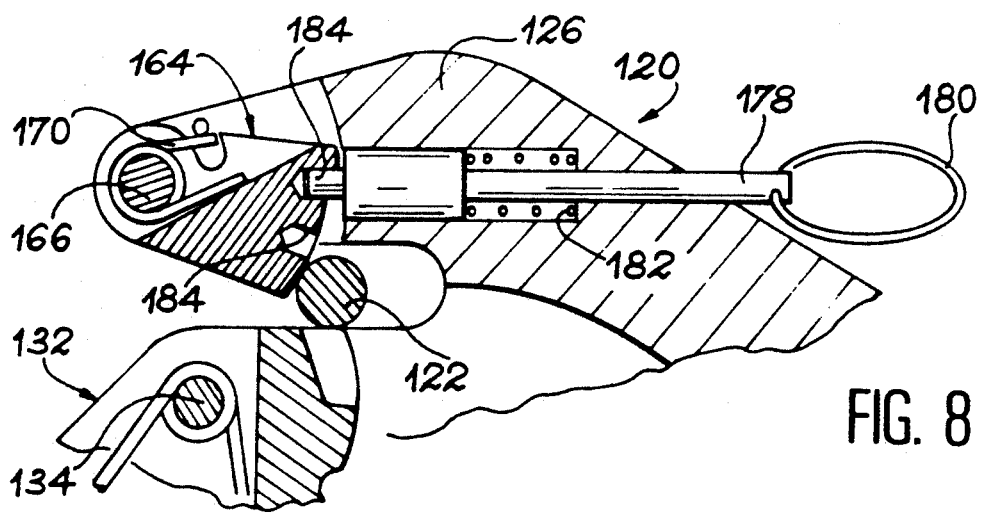
FIG. 8 A view comparable to FIGS. 6 and 7 showing the non-opening means in its closed position, following the control of the opening of the bolt.

In the constructional variant illustrated in FIGS. 6 to 8, each of the bolts 120 incorporates a second clasp 164, mounted so as to pivot on the body 126 by a spindle 166 parallel to the pivoting spindle 134 of the clasp 132 and located on the other side of the slot 130 with respect to said spindle 134. More specifically, the spindle 166 is located in the vicinity of the open end of the slot 130 and the second clasp 164 is housed in a recess 168 formed in the body 126 facing the clasp 132.

A torsion spring 170 wound onto a portion of the spindle 166 located in a notch 172 formed in the clasp 164 bears by a first end on a rod 174 integral with the body 126 and by its opposite end in the bottom of the notch 172. Thus, the spring 170 tends to pivot the clasp 164 in a clockwise direction with reference to FIG. 6, towards a position closing the open end of the slot 130, shown in FIGS. 7 and 8. In this closing position, the bottom portion of the clasp 164 is partly received in a hollowed-out portion 176 formed for this purpose in the clasp 132, when the latter occupies its position closing the open end of the slot 130.

The second clasp 164 normally occupies a retracted position, illustrated in FIG. 6, in which said clasp is totally retracted into the body 126, so as to free the entrance of the slot 130.

The non-opening mechanism for the bolts 120, illustrated in FIGS. 6 to 8, also has an individual control pull handle 178, which slides in the body 126 in a direction orthogonal to the spindles 134, 166 and substantially parallel to the slot 130. The manipulation of the pull handle 178 takes place by means of a ring 180 mounted on its end located outside the body 126. A helical compression spring 182, whose ends respectively bear on the body 126 and on a shoulder formed on the pull handle 178, moves a pin 184 constituting the end of the pull rod 178 against the facing surface of the second clasp 164. Thus, the pin 184 can penetrate a hole 186 or a hole 188 formed on said surface, as a function of whether the second clasp 164 occupies its normal retracted position or its closing position.

Thus, as illustrated in FIG. 6, the pin 184 is normally engaged in the hole 186 under the action of the spring 182, so that the clasp 164 is normally maintained in its retracted position for which the operation of the bolt 120 is entirely identical to that described hereinbefore with reference to FIGS. 1 to 5.

If, for any random reason, the mission leader decides not to release one or more ropes suspended on the bolts 120, he operates the pull handle 178 of the corresponding bolt or bolts 120 by pulling on the ring 180. Under the effect of this tension, the pin 184 passes out of the hole 186 and the clasp 164 then automatically pivots into its closing position illustrated in FIG. 7, under the action of the spring 170.

When the pin 184 is in front of the hole 188, it strikes a projecting portion 190 of the clasp 164, so that the pin 18 automatically penetrates the hole 188 under the action of the spring 182, as soon as the operator releases the ring 180.

As illustrated in FIG. 8, when the operator then actuates the operating lever, which has the effect of pivoting all the clasp 132 into their retracted position, the bolt or bolts 120, whose pull rods 178 have been previously operated, do not release the corresponding ropes, because their rings 122 remain trapped in the recess 130 by the second clasp 164.

Obviously, the invention is not limited to the embodiments described in exemplified manner hereinbefore and covers all variants. Thus, the pivoting clasps of the bolts can be replaced by sliding clasps. Moreover, the locking of these clasps in the closed position by a locking member carried by the latch can, in certain cases, be eliminated.

I claim:

1. Rope installation on a helicopter for lowering to the ground intervention personnel, comprising an autonomous mechanical assembly integrated into a base, which is fixed to a structural member within the helicopter cockpit facing a lateral opening, said autonomous mechanical assembly incorporating:
    fast attachment means of at least one ring integral with the upper end of a rope of said rope installation passing out through said lateral opening, including:
        a body adapted to be fixed to the base,
        a slot formed in said body and whereof one open end can be turned towards the lateral opening of the helicopter, in order to receive the end ring of said rope passing out through said lateral opening, and
        a clasp mounted so as to pivot on the body by a first spindle, so that it can occupy a closed position in which the clasp, bearing on a fixed portion of the bolt, closes the open end of the slot and an open, controlled position, in which said open end is freed, the edge of the clasp turned towards the outside of the slot being shaped in such a way that the end ring of said rod can be introduced into the slot by moving the clasp in opposition to elastic means, said elastic means normally maintaining the clasp in its closed position;
    controlled instantaneous release means of each ring, including:
        a latch mounted so as to pivot on the body by a second spindle and having a cam surface which cooperates with a complimentary cam surface formed on the clasp, and
        a release control lever, integral in rotation with said latch,
    in such a way that, under rotation of said lever, the latch controls pivoting of the clasp from its closed position to its open position and frees the ring.

2. Installation according to claim 1, wherein the release control lever can occupy a first position locking the clasp in its closed position, a second position in which the clasp is unlocked and still occupies its closed position and a third position in which the clasp is in the open position.

3. Installation according to claim 1, wherein the first pivoting spindle of the clasp is located in the vicinity of the open end of the slot and in the vicinity of a line for applying a force from the ring to the clasp, which is essentially the direction of the end of the rope connected to the ring when said rope is held taut by a vertical load, so that the application of a force along said line tends to pivot the clasp towards its closed position.

4. Installation according to claim 1, wherein the cam surface formed on the latch has a cylindrical portion centered on the second spindle on which bears the end of a tapered portion of the clasp, when the latter is in the closed position, and a gear tooth-shaped portion able to cooperate with said complimentary cam surface, which is shaped like a tooth system.

5. Installation according to claim 4, wherein the autonomous mechanical assembly also has safety means preventing any uncontrolled detachment of each ring, said safety means having a locking member carried by the latch and which prevents any rotation of the clasp in opposition to elastic means in the first position of said latch, the gear tooth-shaped portion then essentially being spaced from the complementary cam surface, the locking member releasing the clasp in rotation in the second position of the latch, in which the gear tooth-shaped portion is in contact with the complimentary cam surface of the clasp, so as to allow a pivoting of said clasp in the open direction, during the passage of the latch into the third position.

6. Installation according to claim 2, comprising at least two bolts mounted in the base which can be fixed to the interior of the helicopter, said base being in the form of a beam.

7. Installation according to claim 6, wherein the latches of each of the bolts are mounted on a shaft carried by the beam, said shaft being rendered integral at one of its ends with a release control lever.

8. Installation according to claim 6, wherein in each of the bolts comprises a non-opening means, which is normally neutralized and which is individually operable.

9. Installation according to claim 8, wherein said non-opening means comprises a second clasp mounted in the bolt body in such a way as to occupy a normal retracted position and a position closing the open end of the slot, second elastic means moving the second clasp into its closing position, and an individual control member cooperating with the second clasp to maintain it normally in its retracted position.

10. Installation according to claim 9, wherein the individual control member is a pull handle, whose end penetrates a hole of the second clasp under the action of third elastic means when said second clasp is in the retracted position, the second clasp being mounted so as to pivot in the body of the bolt by a third spindle located in the vicinity of the open end of the slot, on the side opposite to the first spindle with respect to said slot.

11. Installation according to claim 7, wherein the operating member is drawn back towards its position corresponding to the first locking position of the clasp of each by fourth elastic means.

12. Installation according to claim 7, wherein the operating member comprises a locking part, which has to be operated to control a passage of the clasp of each bolt from its first position to its second position and vice-verse.

* * * * *

UNITED STATES PATENT AND TRADEMARK OFFICE
CERTIFICATE OF CORRECTION

PATENT NO. : 5,158,247
DATED : October 27, 1992
INVENTOR(S) : Jean-Jacques Ferrier It is certified that error appears in the above-indentified patent and that said Letters Patent is hereby corrected as shown below:

On the title page: Item [73] should read:

--AEROSPATIALE Société Nationale Industrielle, Paris France

Signed and Sealed this

Twelfth Day of October, 1993

*Attest:*

BRUCE LEHMAN

*Attesting Officer*  *Commissioner of Patents and Trademarks*